United States Patent
Lebizay

(10) Patent No.: US 8,605,714 B2
(45) Date of Patent: *Dec. 10, 2013

(54) METHOD AND NETWORK ELEMENT FOR ESTABLISHING A IP COMMUNICATIONS SESSION BETWEEN MOBILE COMMUNICATION DEVICES

(75) Inventor: Gerald Lebizay, Las Vegas, NV (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,084

(22) Filed: Jun. 11, 2012

(65) Prior Publication Data

US 2012/0250624 A1 Oct. 4, 2012

Related U.S. Application Data

(60) Continuation of application No. 12/563,555, filed on Sep. 21, 2009, now Pat. No. 8,204,044, which is a division of application No. 11/027,915, filed on Dec. 30, 2004, now Pat. No. 7,593,390.

(51) Int. Cl.
*H04L 12/66* (2006.01)
*H04M 1/57* (2006.01)
*G06F 21/00* (2013.01)

(52) U.S. Cl.
USPC ........... 370/352; 370/328; 370/331; 370/389; 370/401; 370/469; 379/373.01; 455/405; 455/416; 455/555; 709/202; 709/219; 709/221; 709/224; 726/9

(58) Field of Classification Search
USPC ......... 370/328, 331, 338, 349, 352, 389, 401, 370/329, 469; 379/373.01; 455/416, 555, 455/405; 709/202, 224, 219, 221; 726/9
See application file for complete search history.

(56) References Cited

U.S. PATENT DOCUMENTS 5,351,234 A 9/1994 Beierle et al.
5,430,730 A 7/1995 Sepulveda-Garese et al.
(Continued)

FOREIGN PATENT DOCUMENTS

EP 0758835 2/1997
EP 0758835 A2 2/1997
(Continued)

OTHER PUBLICATIONS

"U.S. Appl. No. 11/027,915, Notice of Allowance mailed May 14, 2009", 8 pgs.

(Continued)

*Primary Examiner* — Gerald Gauthier
(74) *Attorney, Agent, or Firm* — Schwegman, Lundberg & Woessner, P.A.

(57) ABSTRACT

Embodiments of a network element and method of establishing an internet-protocol communications session between a first device and a second device and generally described herein. In some embodiments, the network element is configured to receive a request from the first device to invite the second device to participate in an IP communications session. The second device may be identified in the request by a network identifier. The network element may relate the network identifier to a mobile IP (MIP) address of the second device and a second IP address. The network element may send an invitation to the MIP address of the second device. The invitation may include a MIP address of the first device and a first IP address. The first device establishes an IP connection for an IP communications session with the second device using the MIP address of the second device and the second IP address.

21 Claims, 4 Drawing Sheets

(56) References Cited

U.S. PATENT DOCUMENTS

| | | |
|---|---|---|
| 5,715,242 A | 2/1998 | Ortel et al. |
| 5,793,762 A | 8/1998 | Penners et al. |
| 5,862,481 A | 1/1999 | Kulkarni et al. |
| 6,226,287 B1 | 5/2001 | Brady |
| 6,477,172 B1 | 11/2002 | Burger et al. |
| 6,553,515 B1 | 4/2003 | Gross et al. |
| 6,606,059 B1 | 8/2003 | Barabash |
| 6,614,781 B1 | 9/2003 | Elliott et al. |
| 6,628,671 B1 * | 9/2003 | Dynarski et al. ............ 370/469 |
| 6,640,239 B1 | 10/2003 | Gidwani |
| 6,792,086 B1 | 9/2004 | Saylor et al. |
| 6,917,611 B2 * | 7/2005 | Dorenbosch et al. ........ 370/352 |
| 6,928,558 B1 * | 8/2005 | Allahwerdi et al. ............ 726/9 |
| 6,970,474 B1 | 11/2005 | Sinha |
| 6,985,935 B1 * | 1/2006 | Zhang et al. ................. 709/219 |
| 7,003,571 B1 | 2/2006 | Zombek et al. |
| 7,016,325 B2 * | 3/2006 | Beasley et al. ............... 370/331 |
| 7,031,280 B2 | 4/2006 | Segal |
| 7,039,025 B1 | 5/2006 | Menon et al. |
| 7,046,996 B1 | 5/2006 | Andersen |
| 7,080,151 B1 | 7/2006 | Borella et al. |
| 7,082,118 B1 * | 7/2006 | Sethi ............................. 370/349 |
| 7,120,122 B1 | 10/2006 | Starr et al. |
| 7,126,939 B2 * | 10/2006 | Barany et al. ................. 370/352 |
| 7,139,263 B2 | 11/2006 | Miller et al. |
| 7,146,418 B2 * | 12/2006 | Bahl ............................. 709/224 |
| 7,184,418 B1 * | 2/2007 | Baba et al. ................... 370/331 |
| 7,184,530 B2 | 2/2007 | Warrier et al. |
| 7,193,980 B2 * | 3/2007 | Wenzel et al. ................ 370/329 |
| 7,251,218 B2 | 7/2007 | Jorgensen |
| 7,266,185 B2 | 9/2007 | Trandal et al. |
| 7,277,434 B2 * | 10/2007 | Astarabadi et al. ........... 370/389 |
| 7,286,520 B2 * | 10/2007 | Takeda et al. ................ 370/349 |
| 7,333,482 B2 | 2/2008 | Johansson et al. |
| 7,359,373 B2 | 4/2008 | Kuusinen et al. |
| 7,428,234 B2 | 9/2008 | Forte-McRobbie et al. |
| 7,444,139 B1 * | 10/2008 | Welch et al. .................. 455/416 |
| 7,499,702 B2 | 3/2009 | Rubenstein |
| 7,577,725 B1 * | 8/2009 | Sitaraman et al. ........... 709/221 |
| 7,593,390 B2 | 9/2009 | Lebizay |
| 7,668,145 B2 * | 2/2010 | Le et al. ....................... 370/338 |
| 7,672,003 B2 | 3/2010 | Dowling et al. |
| 7,672,317 B2 * | 3/2010 | Gateva et al. ................ 370/401 |
| 7,764,640 B2 * | 7/2010 | Lee et al. ..................... 370/328 |
| 7,805,161 B1 * | 9/2010 | Jones et al. ................... 455/555 |
| 8,031,671 B2 * | 10/2011 | Harper et al. ................ 370/331 |
| 8,204,044 B2 * | 6/2012 | Lebizay ....................... 370/352 |
| 8,265,060 B2 * | 9/2012 | Mahendran et al. .......... 370/352 |
| 8,363,616 B2 * | 1/2013 | Rezaiifar et al. ............. 370/331 |
| 8,463,231 B1 * | 6/2013 | Williams ..................... 455/405 |
| 2002/0064164 A1 * | 5/2002 | Barany et al. ................. 370/401 |
| 2002/0069165 A1 | 6/2002 | O'Neil |
| 2002/0116464 A1 | 8/2002 | Mak |
| 2002/0126656 A1 | 9/2002 | Park |
| 2002/0141386 A1 | 10/2002 | Minert et al. |
| 2002/0159439 A1 | 10/2002 | Marsh et al. |
| 2003/0014488 A1 | 1/2003 | Dalal et al. |
| 2003/0018704 A1 * | 1/2003 | Polychronidis et al. ...... 709/202 |
| 2004/0017905 A1 | 1/2004 | Warrier et al. |
| 2004/0120505 A1 * | 6/2004 | Kotzin et al. ............ 379/373.01 |
| 2005/0058119 A1 | 3/2005 | Inouchi et al. |
| 2005/0141694 A1 | 6/2005 | Wengrovitz |
| 2005/0195800 A1 | 9/2005 | Anders et al. |
| 2005/0259636 A1 | 11/2005 | Chun |
| 2005/0265278 A1 * | 12/2005 | Hsu et al. ..................... 370/328 |
| 2006/0098624 A1 | 5/2006 | Morgan et al. |
| 2006/0114856 A1 | 6/2006 | Hirata et al. |
| 2006/0146797 A1 | 7/2006 | Lebizay |
| 2009/0208013 A1 | 8/2009 | Watanabe et al. |
| 2010/0008345 A1 | 1/2010 | Lebizay |
| 2010/0149593 A1 | 6/2010 | Dowling et al. |
| 2011/0151915 A1 | 6/2011 | Rosen et al. |
| 2012/0250624 A1 * | 10/2012 | Lebizay ....................... 370/328 |

FOREIGN PATENT DOCUMENTS

| | | |
|---|---|---|
| EP | 0812085 | 12/1997 |
| EP | 0812085 A1 | 12/1997 |
| TW | 240066 | 8/2004 |
| WO | WO-9844640 | 10/1998 |
| WO | WO-9844640 A2 | 10/1998 |
| WO | WO-9963774 A1 | 12/1999 |
| WO | WO-0079825 A1 | 12/2000 |
| WO | WO-0167789 A2 | 9/2001 |
| WO | WO-2006072099 A1 | 7/2006 |

OTHER PUBLICATIONS

"U.S. Appl. No. 12/563,555, Non Final Office Action mailed Nov. 3, 2011", 10 pgs.

"U.S. Appl. No. 12/563,555, Notice of Allowance mailed Feb. 23, 2012", 9 pgs.

"U.S. Appl. No. 12/563,555, Response filed Feb. 2, 2012 to Non Final Office Action mailed Nov. 3, 2011", 12 pgs.

"Chinese Application Serial No. 200580045760.3, Office Action mailed Feb. 2, 2012", w/ English Translation, 7 pgs.

"Chinese Application Serial No. 200580045760.3, Office Action mailed Feb. 16, 2011", with English translation, 5 pgs.

"Chinese Application Serial No. 200580045760.3, Office Action mailed Jun. 8, 2010", 24 Pgs.

"Chinese Application Serial No. 200580045760.3, Office Action mailed Aug. 31, 2011", 7 pgs.

"Chinese Application Serial No. 200580045760.3, Office Action Response filed Dec. 19, 2011", 7 pgs.

"Chinese Application Serial No. 200580045760.3, Response filed Apr. 16, 2012 to Office Action mailed Feb. 2, 2012", 8 pgs.

"Chinese Application Serial No. 200580045760.3, Response filed Oct. 22, 2010 to Office Action mailed Jun. 8, 2010", 10 pgs.

"German Application Serial No. 112005003306.6, Office Action mailed Jan. 19, 2010", 6 pgs.

"International Application No. PCT/US2005/047679 Preliminary Report on Patentability Search Report mailed Jan. 28, 2008", 15 pgs.

"International Application No. PCT/US2005/047679 Preliminary Report on Patentability Written Opinion mailed Jan. 28, 2008", 11 pgs.

"International Application Serial No. PCT/US2005/047679, International Search Report mailed May 4, 2006", 5 pgs.

"International Application Serial No. PCT/US2005/047679, Written Opinion mailed May 4, 2006", 10 pgs.

"Taiwanese Application Serial No. 94147636, Office Action and Search Report mailed Sep. 30, 2008", 8 pgs.

Chaudhury, P., et al., "The 3GPP Proposal for IMT-2000", IEEE Communications Magazine, 37(12), (Dec. 1999), 72-81.

Dutta, A., et al., "Realizing Mobile Wireless Internet Telephony and Streaming Multimedia Testbed", Computer Communication, 27(8), (May 2004), 725-738.

Dutta, A., et al., "Realizing mobile wireless Internet telephony and streaming multimedia testbed", Computer Communications, 27(8), (May 2004), 725-738.

Morand, L., et al., "Global Mobility Approach With Mobile IP in "All IP" Networks", IEEE International Conference on Communications (ICC 2002), 1(5), (Apr. 28, 2002), 2075-2079.

Newman, P., "In Search of the All-IP Mobile Network", IEEE Communications, 42(12), (1220-2004), S03-S05.

Newman, P., "In search of the all-IP mobile network", IEEE Communications Magazine, 42(12), (Mar. 2004), S3-S8.

* cited by examiner

METHOD AND NETWORK ELEMENT FOR ESTABLISHING A IP COMMUNICATIONS SESSION BETWEEN MOBILE COMMUNICATION DEVICES

PRIORITY CLAIM

This application is a continuation of U.S. patent application Ser. No. 12/563,555, filed on Sep. 21, 2009, now issued as U.S. Pat. No. 8,204,044, which is a divisional of U.S. patent application Ser. No. 11/027,915, filed on Dec. 30, 2004, now issued as U.S. Pat. No. 7,593,390, all of which are incorporated herein by reference in their entireties.

TECHNICAL FIELD

Embodiments of the invention relate to voice-over-IP technology implemented on a mobile wireless broadband network.

BACKGROUND

Voice-over-IP (VoIP) technology permits parties to communicate orally over a packet-switched IP network. VoIP technology has grown in popularity, and depending upon certain factors, can offer sound quality that is comparable to that of the public switched telephone network (PSTN).

Also growing in popularity are wireless mobile networks. Wireless mobile networks permit a device to link to a network without requiring a physical conductive line to carry data between the device and the network. Further, such networks permit mobility by allowing a device to change access points in a manner transparent to network elements or nodes outside of the wireless mobile network domain.

Despite the growing popularity of VoIP technology and wireless mobile networks, there are no mobile client devices for present VoIP services over the Internet. One factor that hinders the advancement such mobile devices relates to finding a simple scheme by which a mobile device may be permitted to roam a significant geographic area (and therefore potentially wander between domains), while appearing keep a single IP address. The user datagram protocol (UDP) indexes connections by use of a quadruplet that contains the IP addresses and port number of both connection endpoints. Changing any one of these four numbers causes the connection to be disrupted and lost. Therefore, it is important that the device appear to keep the same IP address while roaming geographically. The difficulty in addressing this issue grows as the geographic area through which a device is permitted to roam grows.

From the foregoing, it is evident that there exists a need for a scheme by which a wireless IP telephony device can be permitted to roam a geographically significant area, such as a metropolitan area. It is desirable that such a scheme be relatively simple to implement as an overlay to an existing wireless network. It is further desirable that such a scheme be easily interconnected to the PSTN.

DETAILED DESCRIPTION

Figure 1:
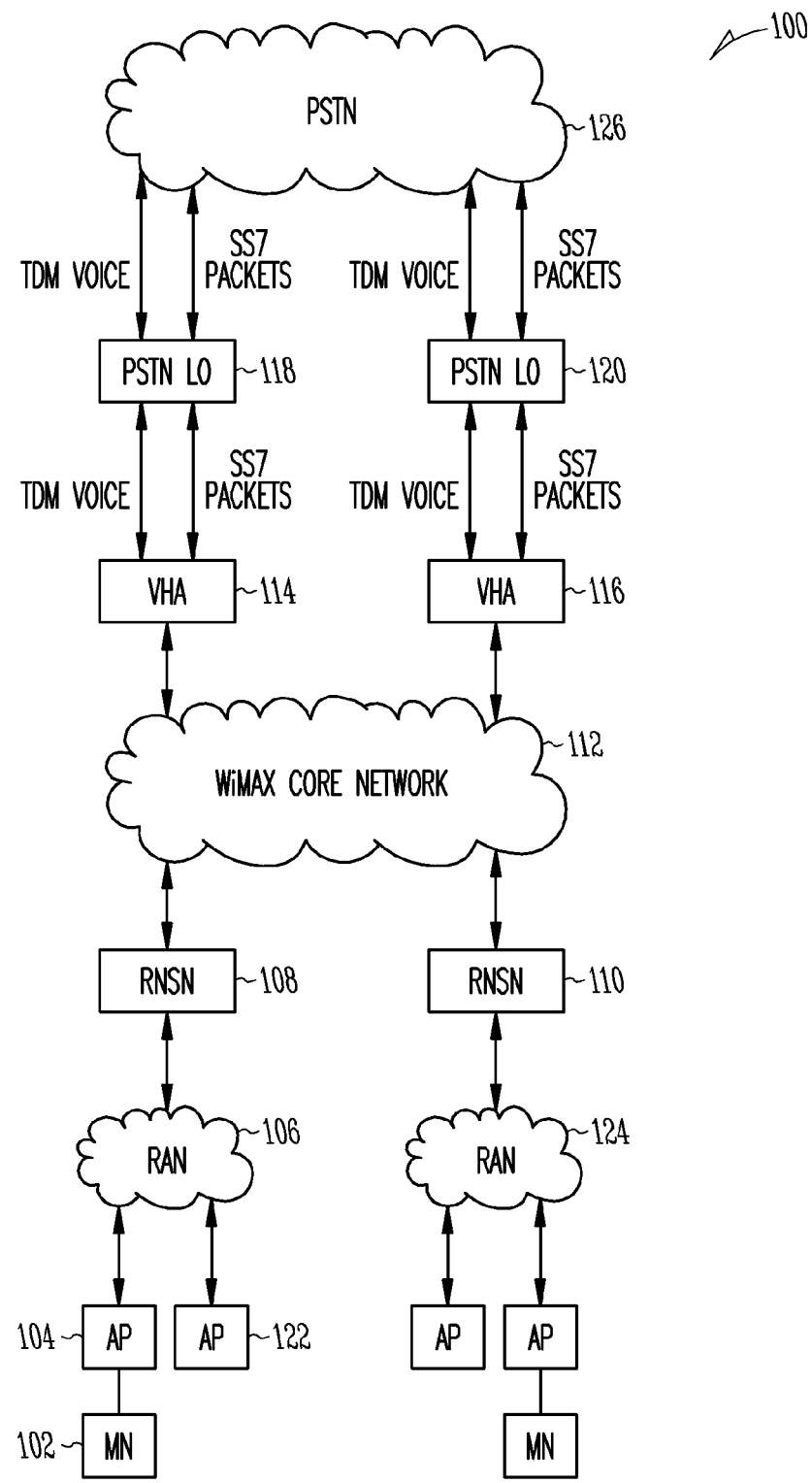
FIG. 1 depicts a network environment in which an embodiment of a voice home agent is deployed.

FIG. 1 depicts a network environment 100 in which one or more mobile nodes 102 may be permitted to roam over a geographically significant area, such as across a metropolitan area. The mobile nodes 102 communicate via digital transmission (typically in the 2-to-6 GHz licensed bands, with typical channel bandwidths ranging from 1.5 to 20 MHz) to an access point 104. An access point (also referred to herein as a base station), such as the one identified by reference numeral 104, receives transmissions from the mobile node, and communicates the transmissions to network elements within an associated regional access network 106. According to an embodiment, the regional access network 106 is a wired network (i.e., a physical line interconnects the various elements making up the regional access network) that is a generic packet based access network, such as an Ethernet network, an IP/MPLS network, or an ATM network. The transmission between the access points 104 and the mobile nodes 102 is compliant with Institute of Electrical and Electronics Engineers (IEEE) 802.16 standard signals, IEEE std. 802.16-2001, published 2001 and later versions (hereinafter IEEE 802.16 standard or IEEE 802.16e standard). A regional access network 106 interconnecting access points (such as 104) compliant with IEEE 802.16e standards is referred to as a WiMAX network.

At the periphery of the WiMAX regional access network 106 is a radio network services node 108. The radio network services node 108 provides routing and control between other WiMAX regional are networks, such as the WiMAX network identified by reference numeral 110. Each regional access network 106 and 124 includes a radio network services node that couples the regional access network 106 or 110 to a WiMAX core network 112, which interconnects all of the regional access networks 106 and 110. Although the WiMAX core network 112 is depicted in FIG. 1 as interconnecting two WiMAX networks 106 and 110, the WiMAX core network 112 may, in principle, interconnect any number of regional access networks.

The WiMAX core network 112 may be an ordinary IP network, composed of commonplace IP network elements, such as optical networking elements permitting high speed data transfer. As such, the WiMAX core network 112 may interconnect directly with the Internet (not depicted in FIG. 1).

At the periphery of the WiMAX core network 112 are one or more voice home agents 114 and 116. There exists a voice home agent 114 or 116 associated with each WiMAX regional access network 106 and 110. The structure of, and methods enacted by, a voice home agent 114 or 116 are discussed in detail below. Briefly, a voice home agent is a network element that permits VoIP integration between a WiMAX core network (such as core network 112) and the public switched telephone network (PSTN). Additionally, a voice home agent provides functionality that permits a mobile node (such as mobile node 102) to roam from one WiMAX regional access network (such as network 106) to another (such as 110).

Although FIG. 1 depicts a single voice home agent 114 or 116 associated with each regional access network 106 or 110, more than one voice home agent may be associated with a given regional access network. Thus, although reference numerals 114 and 116 are presented herein as referring to a single voice home agent, each reference numeral 114 and 116 may be understood as referring to a group of voice home agents servicing their respective WiMAX regional access networks 106 and 110.

Each voice home agent 114 and 116 interfaces the WiMAX core network 112 to a local office 118 or 120 of the public switched telephone network 122. The public switched telephone network 122 uses an out-of-band signaling scheme known as Signaling System 7 (SS7), defined by the International Telecommunication Union (ITU) Telecommunication Standardization Sector (ITU-T). An out-of-band signaling scheme employs a different physical path for call control than is used to carry the content of the call itself (e.g., the voice data). Therefore, as shown in FIG. 1, a voice home agent serves as two separate interfaces: an interface for voice data, which is delivered as time domain multiplexed digital voice data, and an interface for SS7 control signals, which are delivered as SS7 packets.

A mobile node, such as the one identified by reference numeral 102, may be embodied as a telephone handset (in like fashion as a cellular telephone), may be embodied as a personal digital assistant, or may be embodied as another mobile computing device. Upon power-up, a mobile node makes an initial transmission to the nearest available access point. At the time of transmission, the access point assigns the mobile node a management channel, which identifies the mobile node to the access point. The access point and mobile node may communicate with another over a distance ranging from one to five or ten miles. Given the size of such an area, other mobile nodes may be located therein. Therefore, an access point may communicate with hundreds of mobile nodes. The use of management channels permits an access node to distinguish one access point from another.

Each access point in a WiMAX regional access network has an IP address that identifies it. However, this IP address is functional only within the regional access network (also referred to as a domain) in which the access point is situated. Thus, an access point may directly send data to another access point within the regional access network in which it is situated. To direct data to an access point in another domain, the radio network services node servicing the particular domain in which the access point is situated must be used as an intermediary.

As mentioned above, during power-up of the mobile node, an initial transmission is made to the base station for the sake of establishing a management channel and authenticating the user. Thereafter, the mobile node makes an initial communication with the voice home agent servicing the domain in which the mobile node is situated. This communication marks the beginning of a registration process, by which the mobile node informs the voice home agent of which domain the mobile node is in. In response, the voice home agent assigns the mobile node an IP address, known as a mobile IP (MIP) address. The voice home agent also records a care-of address for the mobile node. The MIP address for the mobile node does not change, even should the mobile node wander to a geographic region in which it communicates with another access point or with another WiMAX regional access network altogether. The care-of address, on the other hand, identifies the domain with which the mobile node is communicating, and therefore changes when the mobile node roams from one regional access network to another.

A voice home agent may assign a mobile node more than one IP addresses. For example, a mobile node may have one IP address assigned to it for the carrying of voice data, and another IP address assigned to it for the carrying of signaling data. For the sake of simplicity, the disclosure proceeds from the assumption that each mobile node has a single IP address assigned to it during registration.

At the time of registration, the voice home agent updates a database that it maintains. The database may contain information concerning the features supported by the mobile node (call waiting, voicemail, etc.). The database is updated to associate a telephone number by which the mobile node is identified, the MIP address assigned to the mobile node, and the domain in which the mobile node is located (i.e., the care-of address of the mobile node).

A WiMAX regional access network 106 or 110 employs a technique known as tunneling. By virtue of this technique, movement of a mobile node within a geographic area served by a given WiMAX domain 106 or 110 is transparent to network elements or nodes outside of the domain. Thus, for example, a network node outside of WiMAX domain 106 cannot tell whether mobile node 102 is communicating with access point 104 or access point 122. A network element outside of the domain 106 need only know that the mobile node 102 is located in domain 106 to communicate with the mobile node 102. Therefore, whenever a mobile node (such as mobile node 102) moves from one domain to another, the mobile node re-registers with the voice home agent it previously registered with. In response, the voice home agent updates its database to associate a new care-of address (i.e., network address of the domain with which the mobile node communicates) with the mobile node.

The preceding discussion focused on a network environment in which a voice home agent 114 or 116 operates. The following discussion briefly presents protocol layers making up a voice home agent 114 or 116.

Figure 2:
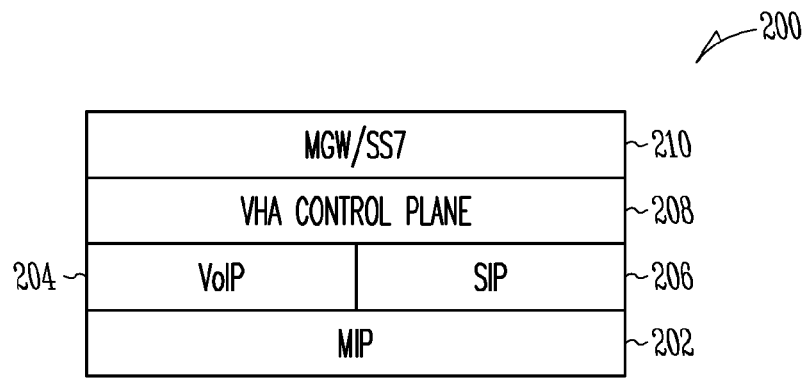
FIG. 2 depicts a protocol stack making up a voice home agent, according to an embodiment of the invention.

FIG. 2 depicts a protocol stack 200 executed by the voice home agent 114 or 116. As can be seen from FIG. 2, the protocol stack 200 includes a Mobile IP (MIP) layer 200 that provides functionality complying with an industry-accepted MIP standard, such as the standard described in "IP Mobility Support," C. Perkins, ed., IETF RFC 2002, October 1996. The functionality provide by the MIP layer 202 is made available to the upper layers 204-210 of the stack 200.

Figure 3:
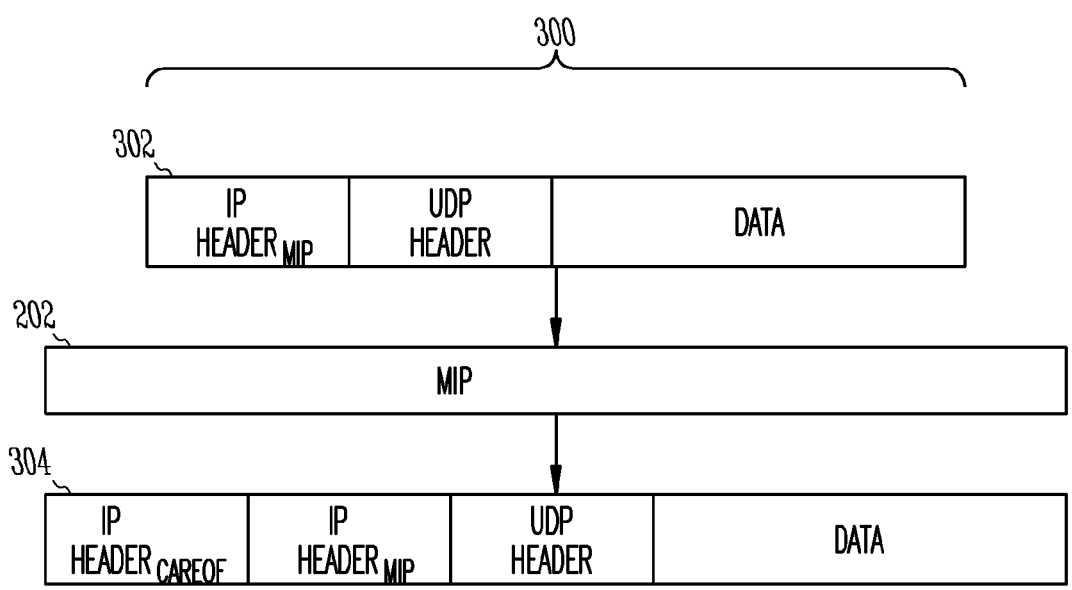
FIG. 3 depicts a tunneling scheme employed by the mobile IP layer of the protocol stack depicted in FIG. 2.

The MIP layer provides the tunneling functionality mentioned above. FIG. 3 depicts the MIP layer 202 receiving a packet 300 having an IP header 302. The IP header 302 contains the MIP address assigned to a particular mobile node in its 32-bit destination IP address field, and it therefore termed IP Header$_{MIP}$. In response to receiving such a packet 300, the MIP layer 202 appends the packet 300 to a second IP header 304. The second IP header uses the care-of address of the particular mobile node identified by the MIP address, and is therefore termed IP Header$_{CareOf}$. Thus, the WiMAX core network 112 observes the second IP header 304 and routes the packet 300 according to the second IP header 304, meaning that the packet 300 is routed to the appropriate domain 106 or 124. Prior to reception by the mobile node, the second IP header 304 is stripped away.

The effect of the tunneling technique described with reference to FIG. 3 is that each mobile node receives IP packets containing the MIP address assigned to it during the registration process. Accordingly, each mobile node may roam—even roam between domains—while retaining the IP address assigned to it during the registration process.

Many layers of tunneling may be used in the network environment 100 depicted in FIG. 1. For example, each WiMAX regional access network 106 and 124 may employ tunneling, so that elements laying outside the domain need only address IP packets to the proper domain in order for the packet to reach the desired mobile node.

Returning to FIG. 2, it can be seen that the protocol stack 200 also includes a VoIP layer 204, which provides voice over IP functionality that may be compliant with an industry-accepted VoIP standard, such as Realtime Transport Protocol (RTP), which is defined by IETF RFC 1889 and/or Realtime Streaming Protocol (RTSP), which is defined by IETF RFC 2326. Briefly, the VoIP layer 204 receives VoIP packets and transforms those packets into time domain multiplexed digital voice data for the public switched telephone network (PSTN) 118 and 120, and vice versa. As discussed below, in the context of a discussion between a user of a mobile node and a user of the PSTN, the VoIP layer 204 converts time domain multiplexed digital data into VoIP packets. The VoIP packets contain the MIP address assigned to the particular mobile node. The VoIP packets are passed to the MIP layer 202, which appends the VoIP packets to an IP header containing the care-of address of the particular mobile node.

The protocol stack 200 also includes a session initiation protocol layer 206, which provides SIP functionality that may be compliant with an industry-accepted standard, such as IETF RFC 3261. Briefly, the SIP layer 206 provides application-layer control functionality for creating, modifying, and terminating communication sessions with one or more participants. For example, the SIP layer 206 contains the functionality to signal a mobile node that another party wishes to communicate with it.

The protocol stack 200 also includes a layer 210 that interfaces with the PSTN. The layer 210 includes a media gateway (MGW) that converts time-domain multiplexed voice data into IP packets. It also includes an SS7 interface that receives SS7 signals, decodes the signals, and passes the extracted information to the voice home agent control plane 208.

The voice home agent control plane 208 coordinates the actions of the other layers. It mediates communication between the major gateway and the VoIP layer 204, and also mediate communication between the SS7 interface and the SIP layer 206. For example, the voice home agent control plane 208 may receive a signal from the S7 interface 210 indicating that a connection to a particular telephone number is desired. In response, the control plane 208 invokes the SIP plane 206 to send an SIP invite message to the mobile node corresponding to the telephone number. Similarly, the control plane 208 receives voice data in a particular time slot and forwards the data to the VoIP layer for conversion into VoIP packets, and for communication to particular mobile node (in this way, a voice path is maintained).

The preceding discussion briefly presented protocol layers 202-210 making up a voice home agent 114 or 116. A discussion relating to the operation of the voice home agent 114 or 116 with respect to call initiation and call execution follows. This discussion describes the operation of the voice home agent as a whole (as opposed to on a layer-by-layer basis), and provides an high-level integrated view of the operation of the voice home agent.

Figure 4:
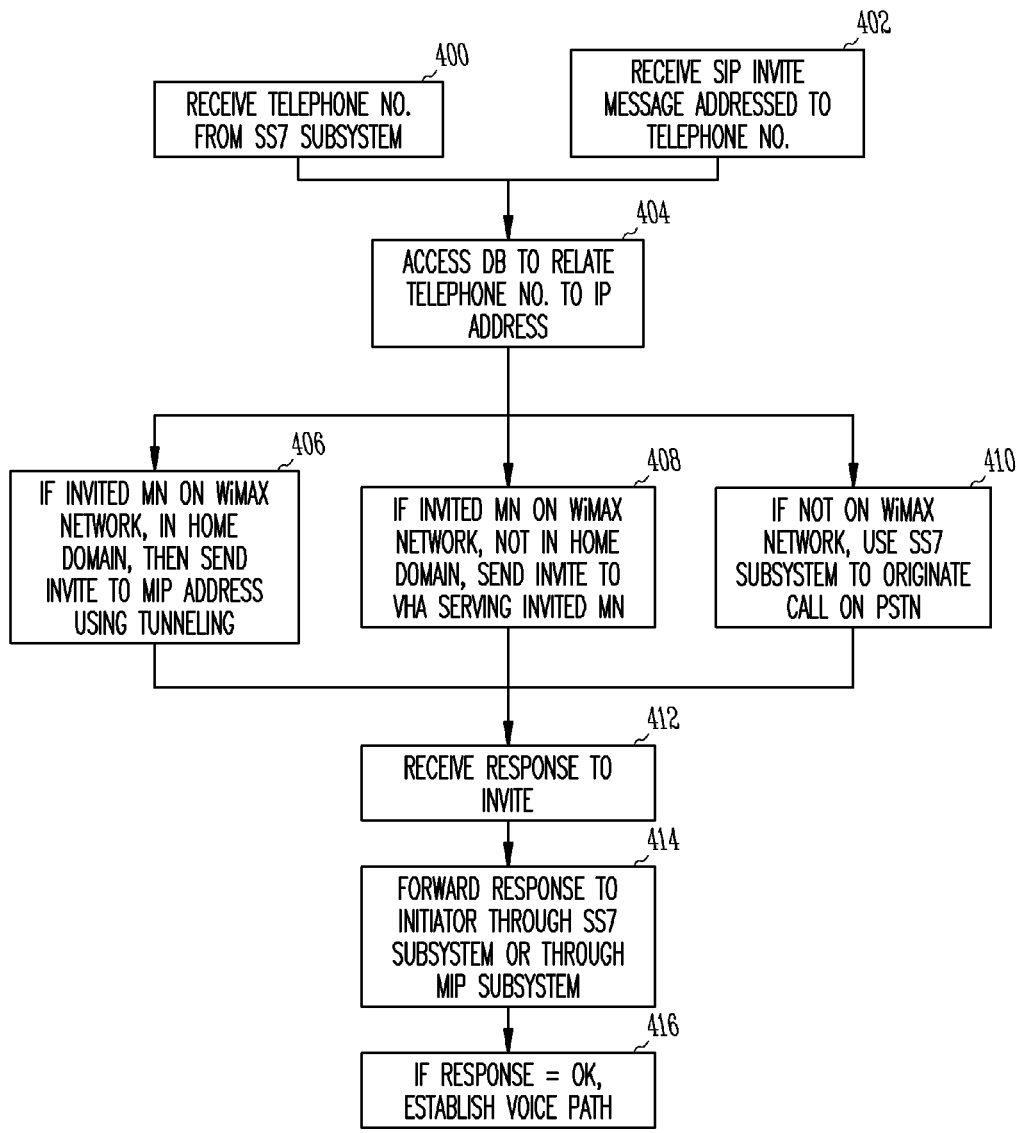
FIG. 4 depicts a method of initiating a VoIP phone call, according to an embodiment of the invention.

FIG. 4 depicts the operation of a voice home 114 or 116 agent in initiating a telephone call to a mobile node. The process may be initiated by a user of the PSTN or by a user of a mobile node served by the voice home agent 114 or 116. If the process is initiated by a user of the PSTN, then the voice home agent 114 or 116 receives an SS7 signal indicating that a telephone call is desired with a mobile node identified by a particular telephone number, as shown in operation 400. The telephone number is extracted from the SS7 signal (operation 400). The SS7 signal is converted into an invite message (operation 400), which is an SIP message indicating that a communication session is desired. Thus, at the completion of operation 400, the voice home agent 114 or 116 has constructed an invite message addressed to a particular telephone number.

On the other hand, the process may have been initiated by a mobile node served by the voice home agent 114 or 116. When a mobile node initiates the phone call, the mobile node sends an SIP invite message addressed to a chosen telephone number to the voice home agent 114 or 116. This SIP invite message is received by the voice home agent, as shown in operation 402.

Whether the SIP invite message is received (as is the case when a mobile node initiates the phone call) or is created by the voice home agent (as is the case when a user of the PSTN initiates the phone call), operation flow next proceeds to operation 404. In operation 404, the voice home agent queries a database to identify a MIP address and care-of address associated with the telephone number embedded in the invite message.

If the telephone number identified in operation 404 corresponds to the domain served by the voice home agent 114 or 116, then the voice home agent 114 or 116 sends the SIP invite message to the mobile node using the tunneling technique described with reference to FIG. 3 (operation 406).

If the telephone number identified in operation 404 corresponds to a domain not served by the voice home agent 114 or 116, then the voice home agent 114 or 116 sends the SIP invite message to the voice home agent 114 or 116 serving the domain corresponding to the invited mobile (operation 408).

If the telephone number indicates that the telephone number refers to a telephony device served by the PSTN, the invite message is converted to an SS7 signal to originate the phone call on the PSTN (operation 410).

After the invite message has been sent (by way of an SIP invite message or by way of an SS7 signal), the voice home agent 114 or 116 awaits a response to the invite message, as shown in operation 412. If the user of the invited telephony device wishes to answer the phone call, a response indicating such a desire is received by the voice home agent 114 or 116 (operation 412). If the response originates from a mobile node, the response may reach the voice home agent 114 or 116 in the form of an SIP acknowledge (ack) message. On the other hand, if the response originates from a PSTN telephony device, the response may come to the voice home agent 114 or 116 in the form of an SS7 signal that may be converted into an SIP ack message.

After the response is received, it is forwarded to the initiator (operation 414). If the initiator of the phone call is a mobile node, the forwarding operation involves sending the response to the mobile node, using MIP layer 202 to employ the tunneling technique described with reference to FIG. 3. On the other hand, if the initiator of the phone call is a telephony device on the PSTN, then the response is converted into an SS7 signal, and is directed to the PSTN through the SS7 interface 210.

Finally, assuming the response received in operation 412 indicates that the user of the invited mobile node wishes to engage in a communication session (i.e., wishes to answer the call), a voice path between the inviting and invited devices is established (operation 416). Establishing the voice path may involve associating a particular time slot in the time-domain multiplexed voice data from the PSTN local office 118 or 120 with a particular MIP address (and vice versa). Additionally, it may involve associating an MIP address of a mobile node with a care-of address or an address of a voice home agent 114 or 116 servicing a particular mobile node.

Figure 5:
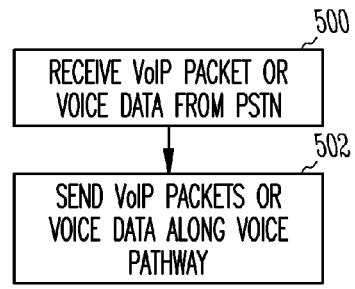
FIG. 5 depicts a method of executing a VoIP phone call, according to an embodiment of the invention.

After a VoIP session has been established (as shown in FIG. 4), the parties may speak to one another. While the parties speak, the voice home agent 114 or 116 receives either VoIP packets or time-domain multiplexed voice data from the PSTN, as shown in operation 500 of FIG. 5. If the voice home agent receives time-domain multiplexed voice data from the PSTN, such data is converted to VoIP packets, as discussed above.

Next, as shown in operation 502, the VoIP packets or voice data are sent along the voice pathway established in operation 416 of FIG. 4. In the case of sending VoIP packets to a mobile node, this may mean sending received VoIP packets to a voice home agent 114 or 116 servicing the mobile node, or may mean directly sending received VoIP packets to a mobile node, using the tunneling technique described with reference to FIG. 3. In the case of sending voice data to telephony device on the PSTN, operation 502 includes converting VoIP data to time-domain multiplexed digital voice data, and inserting such voice data into an appropriate time slot, so that the PSTN switching equipment routes the data to the appropriate location.

The preceding discussion related to the operation of the voice home agent during initiation and execution of a phone call. The following discussion presents, from a system-level point of view, initiation and execution of a phone call in the context of the network environment 100 depicted in FIG. 1.

In the context of a telephone call between a PSTN telephony device (initiator of call) and a mobile node (responder to call), the flow proceeds as follows. Initially, the voice home agent 114 or 116 receives an SS7 signal indicating that a communication session is desired with a mobile device corresponding to a given telephone number. The voice home agent extracts the telephone number, and creates an SIP invite message addressed to an MIP address of the invited mobile node. (If the invited mobile node is not available, the call may be re-routed to a voice mail service.)

By virtue of the tunneling capability of the voice home agent and the various WiMAX domains, the SIP invite message reaches the invited mobile node, addressed to the mobile node's MIP address. Within the SIP invite message, caller-ID information is embedded. Therefore, a message identifying the inviting telephony device may be displayed at the invited mobile node. Meanwhile, the voice home agent 114 or 116 sends an SS7 signal resulting in a ring-back tone to the inviting telephony device.

If the user of the mobile node accepts the call, then an SIP acknowledgement message is sent to the voice home agent 114 or 116. The voice home agent 114 or 116 translates the SIP acknowledgement message into an SS7 signal, and establishes a voice path. At this time, the users of the PSTN telephony device and the mobile node begin speaking.

In the context of a telephone call between two mobile nodes (in different domains), the flow proceeds as follows. Initially, the voice home agent receives an SIP invite message from the inviting mobile node. The SIP invite message is addressed to a telephone number corresponding with the desired mobile node. In response, the voice home agent forwards the SIP invite message to the voice home agent servicing the domain in which the invited mobile node is located. The latter voice home agent sends the response to the MIP address of the invited mobile node.

By virtue of the tunneling capability of the voice home agent and the various WiMAX domains, the SIP invite message reaches the invited mobile node, addressed to the mobile node's MIP address. Within the SIP invite message, caller-ID information is embedded. Therefore, a message identifying the inviting telephony device may be displayed at the invited mobile node. Further, the IP address of the inviting mobile node is contained in the SIP invite message.

If the user of the invited mobile node accepts the call, then an SIP acknowledgement message is sent to the voice home agent 114 or 116 servicing the domain in which the invited mobile node is located. In response, the voice home agent 114 or 116 forwards the SIP acknowledgement message to the voice home agent 114 or 116 servicing the domain in which the inviting mobile node is located. The latter voice home agent 114 or 116 forwards the SIP acknowledgement message to the inviting mobile node's MIP address. The SIP acknowledgement message contains the IP address of the invited node.

Voice communication may now occur in one of two manners. First, the mobile nodes may communicate with one another without the mediation of voice home agents. This is possible because, by virtue of the SIP invite and acknowledgement message, each mobile node is aware of the other's IP address. However, the connection between the two mobile nodes will be lost, should either of the mobile nodes roam to a different domain.

Secondly, the voice path may extend between both voice home agents. This scheme allows for either of the mobile nodes to roam from domain to domain.

Figure 6:
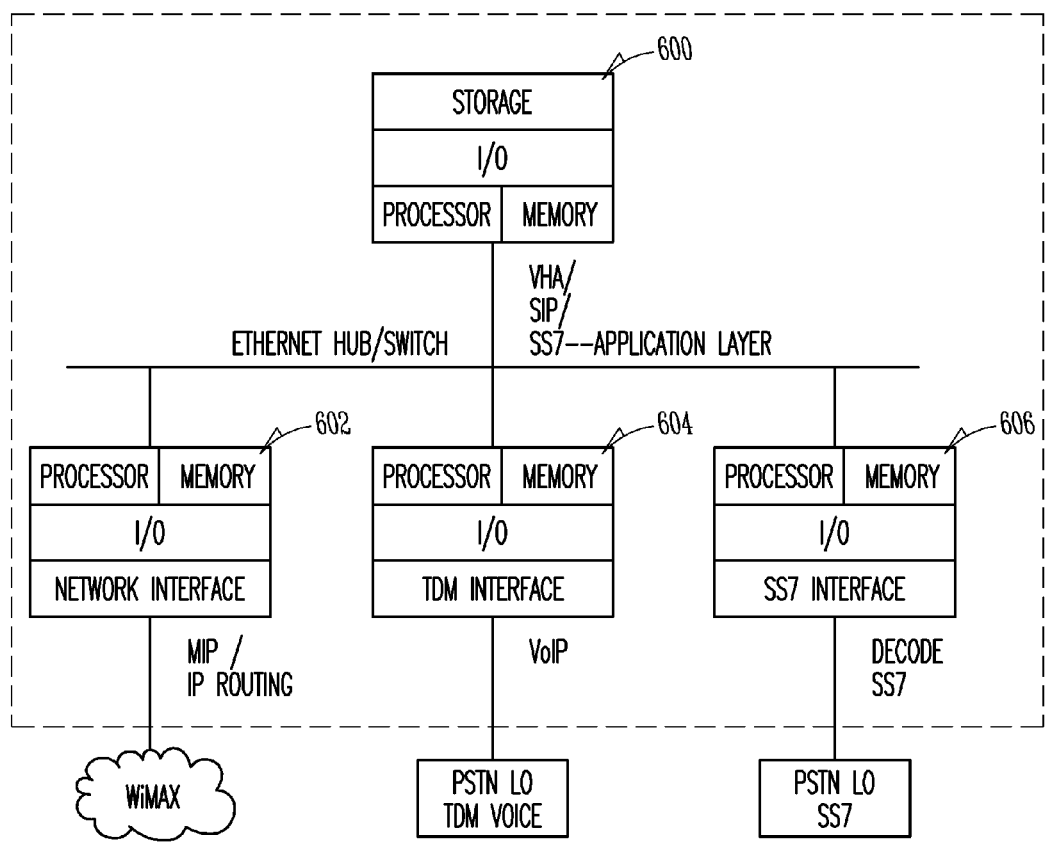
FIG. 6 depicts a hardware environment in which a voice home agent may be embodied, according to an embodiment of the invention.

FIG. 6 depicts a hardware environment in which the voice home agent 114 or 116 may be embodied. The environment includes four blades 600, 602, 604, and 606. Each blade contains its own computing environment, including a processor, a memory, and an input/output module (control hub and I/O bus, for example) providing access to a network interface or to storage. Each blade 600-606 may communicate via a local area network, such as via an Ethernet hub. The blades 600-606 may be embodied as thin boards that may be mounted within a rack.

Each blade may be dedicated to executing various facets of the previously described control plane functions or data plane functions. For example, blade 602 may execute the functions relating to the MIP layer 202. This blade 602 also executes the routing functionality required when a VoIP packet is received, and needs to be routed to another voice home agent, or to a mobile node, as described above. The blade 602 includes a network interface to permit the software/firmware executed thereon to communicate with the WiMAX core network 112.

Blade 604 may execute the VoIP functionality described above with reference to the VoIP layer 204 discussed in FIG. 2. The blade 604 includes a time domain multiplexing interface to permit the software/firmware executed thereon to interact with time domain multiplexed digital voice data from the PSTN.

Blade 606 may decode SS7 signals and send the extracted content to the SS7 application layer functionality residing on blade 600. The blade 606 includes an SS7 interface to permit the software/firmware executed thereon to interact with the SS7 packets from the PSTN local office.

Blade 600 may execute the voice home agent control plane functionality described above. For this purpose, the blade includes a storage device (to maintain the database necessary to enact such functionality). The blade 600 also executes the SIP functionality and application layer functionality of the SS7 subsystem. In one embodiment, the blade 600 executes a billing routine. The billing routine may track, on a user-by-user or account-by-account basis, the amount of time a given user is connected to the network, the amount of traffic consumed by the user, the type of service consumed (local call, long distance call, etc.) by the user, or the bandwidth consumed by the user. The tracked information may be stored in a database, and periodic bills may be generated therefrom.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

The claimed invention is:

1. A method performed by one or more network elements for establishing an internet-protocol (IP) communications session between a first communication device and a second communication device, the method comprising:
   receiving a request from the first communication device to invite the second communication device to participate in an IP communications session, the second communication device being identified in the request by a network identifier;
   relating the network identifier to a mobile IP (MIP) address of the second communication device and a second IP address, the second IP address indicating either a point-of-attachment of the second communication device to a wireless access network or a care-of-address of a domain of a wireless access network in which the second communication device is operating; and
   sending an invitation to the MIP address of the second communication device, the invitation including a MIP address of the first communication device and a first IP address,
   wherein the first communication device is configured to establish an IP connection for an IP communications session with the second communication device using the MIP address of the second communication device and the second IP address.

2. The method of claim 1 further comprising:
   receiving a response to the invitation from the second communication device;
   modifying the response to include a first IP header that includes the MIP address of the second communication device and a second IP header to include the second IP address; and
   forwarding the modified response to the first communication device,
   wherein after receipt of the modified response, the first communication device is configured to establish the IP connection for the IP communications session with the second communication device using the MIP address of the second communication device and the second IP address.

3. The method of claim 2 wherein the first IP address indicates either a point-of-attachment of the first communication device to the wireless access network or a care-of address of a domain of the wireless access network in which the first communication device is operating.

4. The method of claim 3 wherein the invitation that is sent to the MIP address of the second communication device includes either the point-of-attachment or the care of address of the first communication device when the second communication device is operating in a different domain.

5. A method of claim 2 wherein the internet-protocol communications session is a video and voice over IP communications session.

6. The method of claim 5 wherein after receipt of the modified response, the first communication device is configured to establish a peer-to-peer IP connection with the second communication device, the peer-to-peer IP connection including a communication path that does excludes the network element.

7. The method of claim 6 wherein at least one of the first and second communication devices is a wireless or mobile communication device.

8. A network element configured to establish an internet-protocol (IP) communications session between a first communication device and a second communication device, the network element configured to:
   receive a request from the first communication device to invite the second communication device to participate in an IP communications session, the second communication device being identified in the request by a network identifier;
   relate the network identifier to a mobile IP (MIP) address of the second communication device and a second IP address, the second IP address indicating either a point-of-attachment of the second communication device to a wireless access network or a care-of-address of a domain of a wireless access network in which the second communication device is operating; and
   send an invitation to the MIP address of the second communication device, the invitation including a MIP address of the first communication device and a first IP address,
   wherein the first communication device is configured to establish an IP connection for an IP communications session with the second communication device using the MIP address of the second communication device and the second IP address.

9. The network element of claim 8 further configured to:
   receive a response to the invitation from the second communication device;
   modify the response to include a first IP header that includes the MIP address of the second communication device and a second IP header to include the second IP address; and
   forward the modified response to the first communication device,
   wherein after receipt of the modified response, the first communication device is configured to establish the IP connection for the IP communications session with the second communication device using the MIP address of the second communication device and the second IP address.

10. The network element of claim 9 wherein the first IP address indicates either a point-of-attachment of the first communication device to the wireless access network or a care-of-address of a domain of the wireless access network in which the first communication device is operating.

11. The network element of claim 10 wherein the invitation that is sent to the MIP address of the second communication device includes either the point-of-attachment or the care of address of the first communication device when the second communication device is operating in a different domain.

12. The network element of claim 9 wherein the internet-protocol communications session is a video and voice over IP communications session.

13. The network element of claim 12 wherein after receipt of the modified response, the first communication device is configured to establish a peer-to-peer IP connection with the second communication device, the peer-to-peer IP connection including a communication path that excludes the network element.

14. The network element of claim 13, wherein at least one of the first and second communication devices is a wireless communication device.

15. The network element of claim 14 comprising:
interface circuitry to receive the request from the first communication device to invite the second communication device to participate in the IP communications session and to send the invitation to the MIP address of the second communication device; and
processing circuitry relate the network identifier to the MIP address of the second communication device and the second IP address.

16. A network element configured to establish an internet-protocol (IP) communications session between a first communication device and a second communication device, at least one of the first and second communication devices is a wireless communication device, the network element comprising:
interface circuitry to receive a request from the first communication device to invite the second communication device to participate in an IP communications session, the second communication device being identified in the request by a network identifier; and
one or more processors to relate the network identifier to a mobile IP (MIP) address of the second communication device and a second IP address, the second IP address indicating a domain of a wireless access network in which the second communication device is operating,
wherein the interface circuitry is configured to send an invitation to the MIP address of the second communication device, the invitation including a MIP address of the first communication device and a first IP address, and
wherein the first communication device is configured to establish a peer-to-peer IP connection for an IP communications session with the second communication device using the MIP address of the second communication device and the second IP address, the peer-to-peer IP connection including a communication path that excludes the network element.

17. The network element of claim 16 wherein the internet-protocol communications session is a video and voice over IP communications session.

18. The network element of claim 16 further configured to:
receive a response to the invitation from the second communication device;
modify the response to include a first IP header that includes the MIP address of the second communication device and a second IP header to include the second IP address; and
forward the modified response to the first communication device,
wherein after receipt of the modified response, the first communication device is configured to establish the peer-to-peer IP connection for the IP communications session with the second communication device using the MIP address of the second communication device and the second IP address.

19. The network element of claim 18 wherein the second IP address indicates either a point-of-attachment of the second communication device to a wireless access network or a care-of-address of the domain of the wireless access network in which the second communication device is operating.

20. The network element of claim 19 wherein the first IP address indicates either a point-of-attachment of the first communication device to the wireless access network or a care-of-address of a domain of the wireless access network in which the first communication device is operating, and
wherein the invitation that is sent to the MIP address of the second communication device includes either the point-of-attachment or the care of address of the first communication device when the second communication device is operating in a different domain.

21. The network element of claim 17 wherein the network element operates within a wireless regional access network (RAN).

* * * * *